US011540176B2

United States Patent

(12) United States Patent
Balasubramanian et al.

(10) Patent No.: US 11,540,176 B2
(45) Date of Patent: Dec. 27, 2022

(54) METHOD AND APPARATUS FOR LOAD CONTROL OF AN ENTERPRISE NETWORK ON A CAMPUS BASED UPON OBSERVATIONS OF BUSY TIMES AND SERVICE TYPE

(71) Applicant: Celona, Inc., Cupertino, CA (US)

(72) Inventors: Srinivasan Balasubramanian, San Diego, CA (US); Mehmet Yavuz, Palo Alto, CA (US); Preethi Natarajan, Saratoga, CA (US)

(73) Assignee: Celona, Inc., Campbell, CA (US)

( * ) Notice: Subject to any disclaimer, the term of this patent is extended or adjusted under 35 U.S.C. 154(b) by 81 days.

(21) Appl. No.: 17/126,839

(22) Filed: Dec. 18, 2020

(65) Prior Publication Data

US 2022/0150760 A1 May 12, 2022

Related U.S. Application Data

(60) Provisional application No. 63/111,516, filed on Nov. 9, 2020.

(51) Int. Cl.
*H04W 28/00* (2009.01)
*H04W 28/08* (2009.01)
(Continued)

(52) U.S. Cl.
CPC ........ *H04W 28/0942* (2020.05); *G06N 20/00* (2019.01); *H04L 43/0882* (2013.01); *H04W 28/0268* (2013.01); *H04W 28/0289* (2013.01)

(58) Field of Classification Search
CPC ........ G06F 15/16; G01S 5/011; G01S 5/0252; G01S 5/02521; G01S 5/02522;
(Continued)

(56) References Cited

U.S. PATENT DOCUMENTS 9,647,918 B2 * 5/2017 Raleigh ............. H04W 28/0268
2012/0014332 A1 1/2012 Smith et al.
(Continued)

FOREIGN PATENT DOCUMENTS

BR PI 0312065-1 B1 8/2017
WO 2022098558 5/2022
(Continued)

OTHER PUBLICATIONS

Kibria et al., Big Data Analytics, Machine Learning, and Artificial Intelligence in Next-Generation Wireless Networks, IEEE, 11 pages, Apr. 4, 2018.*

(Continued)

*Primary Examiner* — Frank Duong
(74) *Attorney, Agent, or Firm* — Jaquez Land Greenhaus & McFarland; Bruce W. Greenhaus, Esq.

(57) ABSTRACT

A method and apparatus for managing network loading and adjusting admission, and/or congestion and service types based on real-time analytics in an enterprise wireless communication network that includes Base Stations/Access Points (BS/APs) in communication with a number of User Equipment devices (UEs) within the coverage area at a campus location. The system dynamically learns the parameterizations for the control system, and adapts the parameters as the network usage evolves, which is useful for an efficient self-managed network. Such a system can provide a greater QoS across users and other efficiencies. The system simplifies deployment at the enterprise's campus locations because load heatmaps and service patterns are learned based on the actual campus locations.

13 Claims, 8 Drawing Sheets

(51) Int. Cl.

| | |
|---|---|
| ***H04L 43/0882*** | (2022.01) |
| ***G06N 20/00*** | (2019.01) |
| ***H04W 28/02*** | (2009.01) |

(58) Field of Classification Search

CPC ........... G01S 5/02523; G01S 5/02524; H04W 28/0942; H04W 28/0268; H04W 4/02; H04W 4/024; H04W 4/029; H04W 16/08; H04W 28/0289; H04W 36/22; H04W 72/00; G06N 20/00; H04L 12/911; H04L 41/5067; H04L 43/0882; H04L 47/10; H04L 47/76; H04L 67/52

See application file for complete search history.

(56) References Cited

U.S. PATENT DOCUMENTS

| | | | |
|---|---|---|---|
| 2012/0289232 | A1 | 11/2012 | Ostrup et al. |
| 2014/0136709 | A1 | 5/2014 | Chin et al. |
| 2014/0321282 | A1 | 10/2014 | Pragada et al. |
| 2015/0312950 | A1 | 10/2015 | Cartmell |
| 2016/0183156 | A1 | 6/2016 | Chin et al. |
| 2016/0234877 | A1 | 8/2016 | Bangolae et al. |
| 2016/0330602 | A1 | 11/2016 | Das et al. |
| 2018/0007587 | A1 | 1/2018 | Feldman et al. |
| 2019/0045371 | A1 | 2/2019 | Fang et al. |
| 2019/0215729 | A1 | 7/2019 | Oyman et al. |
| 2020/0068411 | A1 | 2/2020 | Vagelos |
| 2020/0205062 | A1 | 6/2020 | Azizi et al. |
| 2021/0195447 | A1* | 6/2021 | Taneja .................. H04W 24/08 |
| 2022/0007199 | A1* | 1/2022 | Mahalingam ......... H04W 24/02 |
| 2022/0070682 | A1* | 3/2022 | Mahalingam ......... H04W 16/18 |
| 2022/0150752 | A1 | 5/2022 | Balasubramanian et al. |
| 2022/0151019 | A1* | 5/2022 | Balasubramanian ........................ H04W 76/38 |

FOREIGN PATENT DOCUMENTS

| | | |
|---|---|---|
| WO | 2022098560 | 5/2022 |
| WO | 2022098561 | 5/2022 |

OTHER PUBLICATIONS

Troglia et al., FaIR: Federated Incumbent Detection in CBRS Band, IEEE, 6 pages, 2019.*

Thomas, Shane, International Search Report and Written Opinion received from the USRO dated Jan. 26, 2022 for appln. no. PCT/US21/57110, 39 pgs.

Rodriguez, Kari, International Search Report and Written Opinon received from the USRO dated Jan. 31, 2022 for appln no. PCT/US21/57107, 16 pgs.

Rodriguez, Kari, International Search Report and Written Opinon received from the USRO dated Feb. 1, 2022 for appln No. PCT/US21/57114, 14 pgs.

* cited by examiner

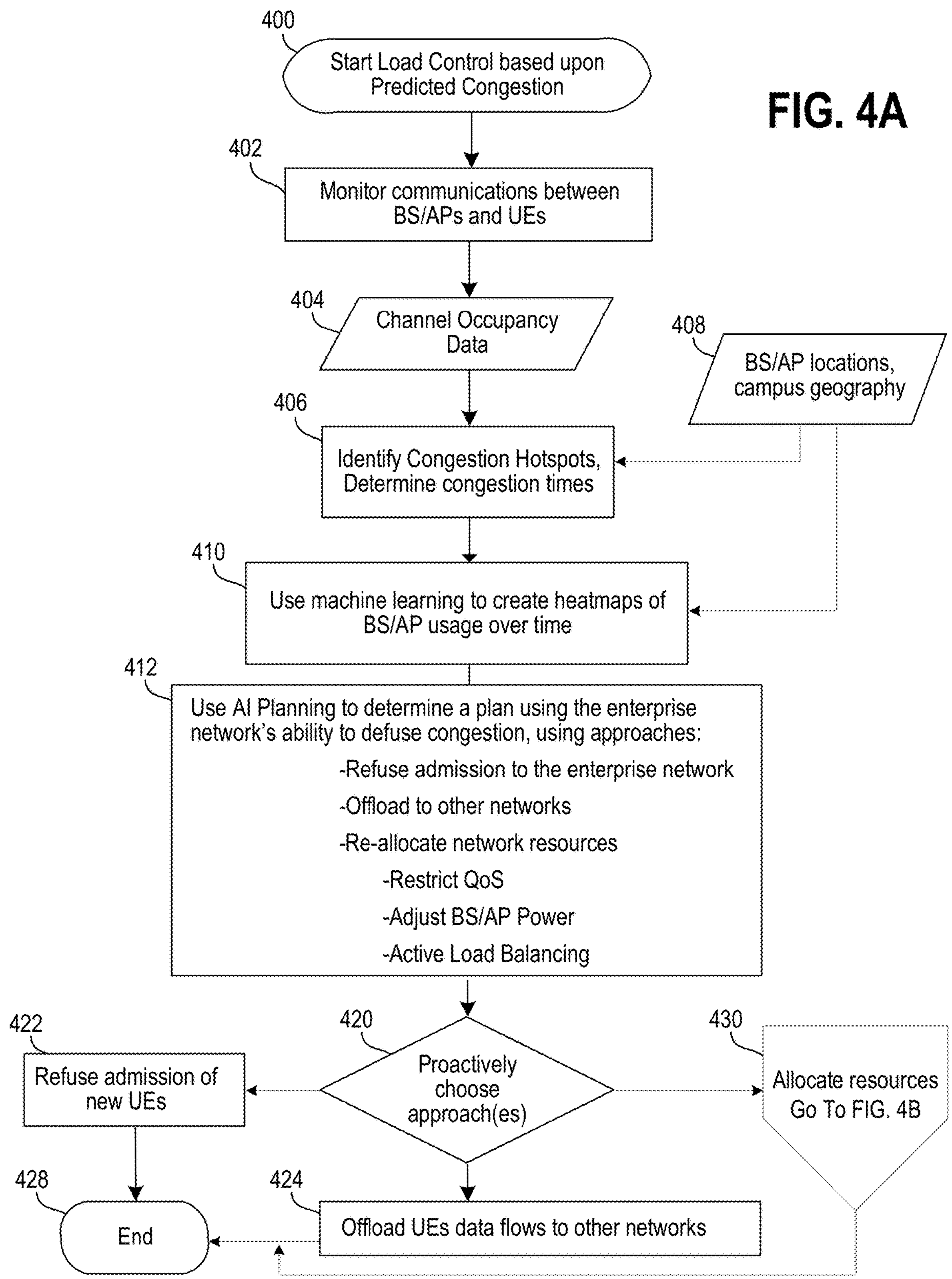

400
Start Load Control based upon Predicted Congestion
FIG. 4A
402
Monitor communications between BS/APs and UEs
404
Channel Occupancy Data
408
BS/AP locations, campus geography
406
Identify Congestion Hotspots, Determine congestion times
410
Use machine learning to create heatmaps of BS/AP usage over time
412
Use AI Planning to determine a plan using the enterprise network's ability to defuse congestion, using approaches:
-Refuse admission to the enterprise network
-Offload to other networks
-Re-allocate network resources
-Restrict QoS
-Adjust BS/AP Power
-Active Load Balancing
422
Refuse admission of new UEs
420
Proactively choose approach(es)
430
Allocate resources Go To FIG. 4B
428
End
424
Offload UEs data flows to other networks

METHOD AND APPARATUS FOR LOAD CONTROL OF AN ENTERPRISE NETWORK ON A CAMPUS BASED UPON OBSERVATIONS OF BUSY TIMES AND SERVICE TYPE

CROSS-REFERENCE TO RELATED APPLICATIONS—CLAIM OF PRIORITY

The present application claims priority to U.S. Provisional Application No. 63/111,516, filed Nov. 9, 2020, entitled "Method and Apparatus for Load Control of an Enterprise Network on a Campus Based Upon Observations of Busy Times and Service Type", which is herein incorporated by reference in its entirety.

BACKGROUND

Technical Field

The disclosed method and apparatus relate to methods and apparatus for monitoring an enterprise wireless communication network at a campus location over a period of time and allocating resources to devices operating wirelessly across the campus location in that enterprise network.

Background

The wireless industry has experienced tremendous growth in recent years. Wireless technology is rapidly improving, and faster and more numerous broadband communication networks have been installed around the globe. These networks have now become key components of a worldwide communication system that connects people and businesses at speeds and on a scale unimaginable just a couple of decades ago. The rapid growth of wireless communication is a result of increasing demand for more bandwidth and services. This rapid growth is in many ways supported by standards. For example, 4G LTE has been widely deployed over the past years, and the next generation system, 5G NR (New Radio) is now being deployed. In these wireless systems, multiple mobile devices are served voice services, data services, and many other services over wireless connections so they may remain mobile while still connected.

Wireless networks have a wide range of applications and uses. Enterprises particularly have a great interest in implementing wireless networks at their locations, and implementing digital solutions generally, to improve efficiency and reduce costs. Enterprises benefit from optimizing their computing, storage and networking infrastructure, and improving performance of the business applications. For this purpose, wireless network systems that make effective use of the spectrum within a business enterprise for wireless communication, improve the efficiency of communication within the organization and between the organization and the external entities. This improved communication capability increases business efficiency and reduces cost.

FIG. 1 is an illustration of a basic configuration for a communication network 100, such as a "4G LTE" (fourth generation Long-Term Evolution) or "5G NR" (fifth generation New Radio) network. Through this network configuration, user equipment (UE) 101 can connect to External Packet Data Networks (PDNs) 103 and access any of a variety of services such as the Internet, Application Servers, Data Services, Voice Services, and others.

UEs

As used herein, the term "UE", or "devices", or "UE devices" refers to a wide range of user_devices having wireless connectivity, such as a cellular mobile phone, an Internet of Things (IOT) device, virtual reality goggles, robotic devices, autonomous driving machines, smart barcode scanners, and communications equipment including for example cell phones, desktop computers, laptop computers, tablets and other types of personal communications devices. In some cases, the UEs may be mobile; in other cases, they may be installed or placed at a fixed position within a campus location. In the illustration of FIG. 1, the UEs 101 include a first mobile phone 101*a*, a second mobile phone 101*b*, a laptop computer 101*c* (which can be moved around), and a printer 101*d* (typically situated at a fixed location). In other examples, the UEs may include factory sensors installed at fixed locations from which they can remotely monitor equipment such as an assembly line or a robotic arm's movement.

The UEs 101 connect wirelessly over communication links 105 to a Radio Access Network (RAN) 107 that includes a base station/access point (BS/AP) 109. One of the advantages of such networks is their ability to provide communications to and from multiple wireless devices and provide these wireless devices with access to a large number of other devices and services even though the devices may be mobile and moving from location to location.

BS/APs

The term "BS/AP" is used broadly herein to include base stations and access points, including at least an evolved NodeB (eNB) of an LTE network or gNodeB of a 5G network, a cellular base station (BS), a Citizens Broadband Radio Service Device (CBSD) (which may be an LTE or 5G device), a Wi-Fi access node, a Local Area Network (LAN) access point, a Wide Area Network (WAN) access point, and should also be understood to include other network receiving hubs that provide access to a network of a plurality of wireless transceivers within range of the BS/AP. Typically, the BS/APs are used as transceiver hubs, whereas the UEs are used for point-to-point communication and are not used as hubs. Therefore, the BS/APs transmit at a relatively higher power than the UEs.

Core Network

The RAN 107 connects the UEs 101 with the Core Network 111. One function of the Core Network 111 is to provide control of wireless signaling between the UEs 101 and the RAN 107, and another function is to provide access to other devices and services either within its network, or on other networks such as the External PDNs 103. Particularly, in cellular networks and in private networks, the BS/AP 109 can receive wireless signals from, and send wireless signals to, the UEs 101. The RAN 107 is coupled to the core network 111; therefore, the RAN 107 and the Core Network 111 provide a system that allows information to flow between a UE in the cellular or private network and other networks, such as the Public Switched Telephone Network (PSTN) or the Internet. Wireless data transmission between a UE 101 and the BS/AP 109 occurs on an assigned channel, such as a specific frequency. Data transmission between the BS/AP 109 and the Core Network 111 utilizes any appropriate communication means, such as wireless, cable, and fiber optic.

In addition to providing access to remote networks and allowing information to flow between the cellular network and the external PDNs 103, the Core Network 111 provides control of the air interface between the BS/AP 119 and the UEs 101. The Core Network 111 may also coordinate the BS/APs 109 to minimize interference within the network.

CBRS Networks

One type of wireless network that recently became available for general use by enterprise locations is a Citizen's Broadband Radio Service (CBRS) network, which utilizes the CBRS radio band of 3550-3700 MHz, nominally divided into fifteen channels of 10 MHz each. Particularly, the US Federal Government recently approved use of the CBRS band of the frequency spectrum and finalized rules (Rule 96) that allow general access to the CBRS band. The CBRS rules set forth detailed requirements for the devices that operate in a CBRS network and how they communicate. CBRS supports both LTE and 5G devices.

In order to accommodate prior users in this spectrum and as a condition for opening it for general use, certain prior users (including the military) have been given a higher priority to access the spectrum. To ensure that these users are given higher priority, use of this radio band is subject to spectrum control by a Spectrum Access System (SAS). Any enterprise implementing a CBRS network must follow the directions given by the SAS, such as which channels it can use and how much power it can transmit. In some instances, previously authorized channels may be suspended (temporary suspension of grant) or fully terminated (permanent termination of grant) by the SAS, and the CBRS network is then given a fixed period of time (sixty seconds currently) to terminate transmissions on that channel, which unfortunately can disrupt enterprise network operations and require reconfiguration to compensate for the lost channel.

FIG. 2 is a diagram of a wireless communication network in which a CBRS system can be implemented. In FIG. 2, a plurality of BS/APs 201, 202, 205, 206 are shown deployed within a location 200 on the enterprise's campus.

Each BS/AP 201, 202, 205, 206 has a range that represents its respective wireless coverage. The BS/APs may be CBSDs in a CBRS system. A first UE 202 is wirelessly connected to a first BS/AP 201, which is providing service to it. A second UE 204 is wirelessly connected to a second BS/AP 202, and is providing service to that second UE 204. Other UEs, which connect to the BS/APs, are shown in the enterprise location 200. All the BS/APs are connected to an operator network by any appropriate communication means, such as wire, fiber optic, wireless radio and/or a PDN 200. The operator network 222 includes an OAM Server 207, a SON assist unit 208, a Domain Proxy 209, an Automatic Configuration Server (ACS) 210, a Location Database 211, and other databases 212, all of which are connected to each other within the operator network 222 by any appropriate means. The operator network is connected to an SAS 232, which is connected to a Spectrum Database 233 that includes data regarding the spectrum that it is managing. Collectively, the SAS 232 and the Spectrum Database 233 are referred to as a Spectrum Management Entity (SME) 234.

Base stations (BS/APs) within a CBRS network are termed "CBSDs", and UEs are termed End User Devices (EUDs). CBSDs are fixed Stations, or networks of such stations, that operate on a Priority Access or General Authorized Access basis in the Citizens Broadband Radio Service consistent with Title 47 CFR Part 96 of the United States Code of Federal Regulations (CFR).

The CBRS rules require that a Spectrum Access System (SAS) allocate spectrum to the CBSDs to avoid interference within the CBRS band. The Spectrum Access System (SAS) is a service, typically cloud-based, that manages the spectrum used in wireless communications of devices transmitting in the CBRS band, in order to prevent harmful interference to higher priority users such as the military and priority licensees. A CBRS device (CBSD) needs authorization from the SAS before starting to transmit in the CBRS band. Even after authorization, the SAS may suspend or terminate authorization of one or more the channels previously authorized.

Regardless of complexities, the CBRS band provides an opportunity to create new wireless networks, and there is a desire for utilizing and making maximum use of spectrum in the CBRS band while following the rules pertaining the CBRS usage, including effectively responding to directions from the SAS.

Conventional Admission and System Usage Control

Conventional admission control of individual users and service is performed using static resource reservations, which typically involves allocating the maximum resource needs associated with a given service. Based on the algorithm of choice and the headroom allocated for variabilities in the services, conventional admission control either overestimates or underestimates in terms of the network capacity planning. A given service can be supported with several configurations; however, because it has no awareness of the potential congestion the network could face, the network's admission control and service configurations are based on fixed configurations.

There are also other variabilities in the system usage, based on the real-time population of the users and actives services. In addition, a given device/user can potentially be supported on multiple networks (e.g., macro cell, enterprise cell, Wi-Fi access point). Using a static approach both restricts the availability of the enterprise network and degrades the user experience under specific conditions. A lack of awareness of these dynamic conditions in the network, including the predictability aspects, limits the operability of the enterprise network.

SUMMARY

Enterprise wireless communication networks have been moving towards digital solutions and therefore are continually searching to optimize their computing, data storage and networking infrastructures to provide optimal performance of their applications and connectivity for their users. For this purpose, wireless network systems are being developed to make effective use of the wireless spectrum available on the enterprise's campus locations. More efficient use of spectrum improves communication capabilities, reduces costs, and increases organizational efficiencies.

A system is disclosed herein to manage network loading, dynamically adjusting admission/congestion control based on real-time analytics. An effective admission/congestion control system is an important element in realizing an effective network. Dynamically learning the parameterizations for the control system, and adapting the parameters as the network usage evolves, is essential for an efficient self-managed network. Such a system can provide a greater QoS across users and other efficiencies.

The system disclosed herein simplifies deployment at network locations. Particularly, a system is disclosed in which load heatmaps and service patterns are learned based on the actual campus location. Over time, the patterns are re-learned and the deployment preferences eventually become customized to the particular campus location. On initial deployment, an educated estimate of the heatmaps, service patterns and other behavior can be made, and different types of connectivity can be deployed based upon this estimate. Learning from other campuses that certain pattern and behavior is useful and/or needed. Using learned quantities from previous campus deployments, network behavior of new campuses can be initialized based upon the similarities with the previous campuses, which can and allow the new network to be deployed in a more optimum manner.

Otherwise, if the network were to be manually deployed and set up in a conventional manner, deployment becomes expensive, consuming time and resources, and less accurate. As the enterprise network becomes self-learning as disclosed herein, it can better allocate resources in a more optimum manner: self-learning optimizes connectivity, resource allocation by network, and mobility from macro network to enterprise network (in and out). In addition, there is greater QoS that can be managed across the network(s), better reliability for the end user, and easier and more effective resource management from an enterprise IT perspective.

The system disclosed herein simplifies deployment at campus locations, on campus by campus basis. However, individual campus deployments have a lot of variabilities. These include:

Campus types: carpeted/non-carpeted;
Types of users
Types of services
Times of usage
Expected levels (grades) of services
Device types
Types of partnership including interworking with Mobile Network Operator (MNO) networks The system disclosed herein simplifies deployment because a number of these behaviors can be learned for optimized performance.

By generating heatmaps and determining service pattern, bursts in activity can be predicted with some accuracy. Generally, it is better to anticipate and proactively respond before a burst in activity; otherwise (if the system just waits until it is already overloaded), calls will be dropped, and service can suffer greatly. Particularly, when cell power is reallocated among cells (i.e. some cells shrink in coverage and others grow) physical characteristics of the wireless signals, such as signal power and multipath, can change dramatically (nonlinearly), which causes reported session quantities such as RSRP (Reference Signals Received Power), which is a measurement of the received power level in an LTE cell network. The average power is a measurement of the power received from a single reference signal. As channel quality indicators change, and connectivity drops. This can cause the RRC scheduler to behave erratically, misinterpreting what is happening, not knowing what to do, and responding sub-optimally. So in general, if cell power is reallocated after the system is already overloaded and a large number of active sessions are in progress, then many more of the users' sessions will be adversely affected (e.g., more calls dropped) than if power had been reallocated proactively before the burst of activity that caused the overload. Therefore, it is important for the network to reallocate resources proactively, prior to any burst in activity.

In an enterprise network, in which the locations of the BS/APs are known in the context of the campus geography (the network footprint), cell-breathing, in which some cells shrink in coverage and others grow, becomes feasible, whereas in a macrocell network (such as an MNO network) it is not feasible. Thus, in an enterprise network at a campus location, cell-breathing can be effectively utilized to reallocate resources and disclosed herein.

The length of voice calls can make a difference in allocating network resources: if the calls tend to be longer (i.e. a longer average), then a different network allocation is needed than if the duration of the calls is shorter. Therefore, data can be collected to observe lengths of calls, which is useful to know for the learning algorithm. Based upon heat map that take into account the lengths of calls, the bit rate on the voice calls might need to be reduced, to support the expected number or length of calls.

Various embodiments of a wireless communication network are disclosed. In some embodiments the wireless network operates on the Citizen's Broadband Radio Service (CBRS band), the BS/APs comprise CBRS Devices (CBSDs) that are located at a campus location and form part of an enterprise network.

BRIEF DESCRIPTION OF THE DRAWINGS

The disclosed method and apparatus, in accordance with one or more various embodiments, is described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

FIGS. 4A and 4B are flow charts that combine to show operations to learn busy times in a wireless communication network and anticipate and control the load on the radio link to provide service to the UEs attached to the BS/APs. Particularly, FIG. 4A is a flow chart that shows overall load control operations based upon predicted congestion, and FIG. 4B is a flow chart of operations to allocate resources.

The figures are not intended to be exhaustive or to limit the claimed invention to the precise form disclosed. It should be understood that the disclosed method and apparatus can be practiced with modification and alteration, and that the invention should be limited only by the claims and the equivalents thereof.

DETAILED DESCRIPTION (1) 4G and 5G Communication Networks and Systems

Communication networks and system components are described herein using terminology and components relating to CBRS systems and their approved (registered) interfaces including 4G (LTE) (IEEE 802.16e), 5G NR 3GPP TS 38.300, E_UTRA (3GPP TS 36.300) communication systems. For instance, the term "CBSD" is one implementation of a Base Station/Access Point (BS/AP), and used herein for descriptive purposes in the context of a CBRS system. The principles of the communication network described herein more widely apply to other communication networks and systems, and particularly to any spectrum-controlled communication system and network. In some embodiments, the enterprise wireless communication network operates on the CBRS band and the BS/APs comprise CBRS devices (CBSDs) that are located at a campus location.

(2) Enterprise Networks, Campus Location

An implementation of an enterprise wireless communication network at a campus location is described herein. The term "enterprise" is used herein in its broadest sense to include any organization, such as businesses, research organizations, schools, colleges, hospitals, industry organizations, and any other organization, regardless of whether or not for profit. The term "campus" is used in its broadest sense to include any area in which the enterprise operates, such as the grounds and/or buildings operated or managed by the enterprise, college campuses, research centers, industrial complexes, any business or industrial site, and others.

Although described in the context of an enterprise wireless communication network, the principles disclosed can also apply to any private network. An enterprise wireless communication network is one type of private network. Private networks are operated for use within a limited area by a limited group of authorized users, whereas public networks generally cover a larger area and are open for use by anyone that subscribes to the service by the network operator. One or more enterprise networks can be created at a location such as a warehouse, factory, research center or other building, and is usually operated by an organization for its own use. Other types of private networks may be operated by a private network manager for use by more than one organization.

(3) CBRS Communication Network

Figure 1:
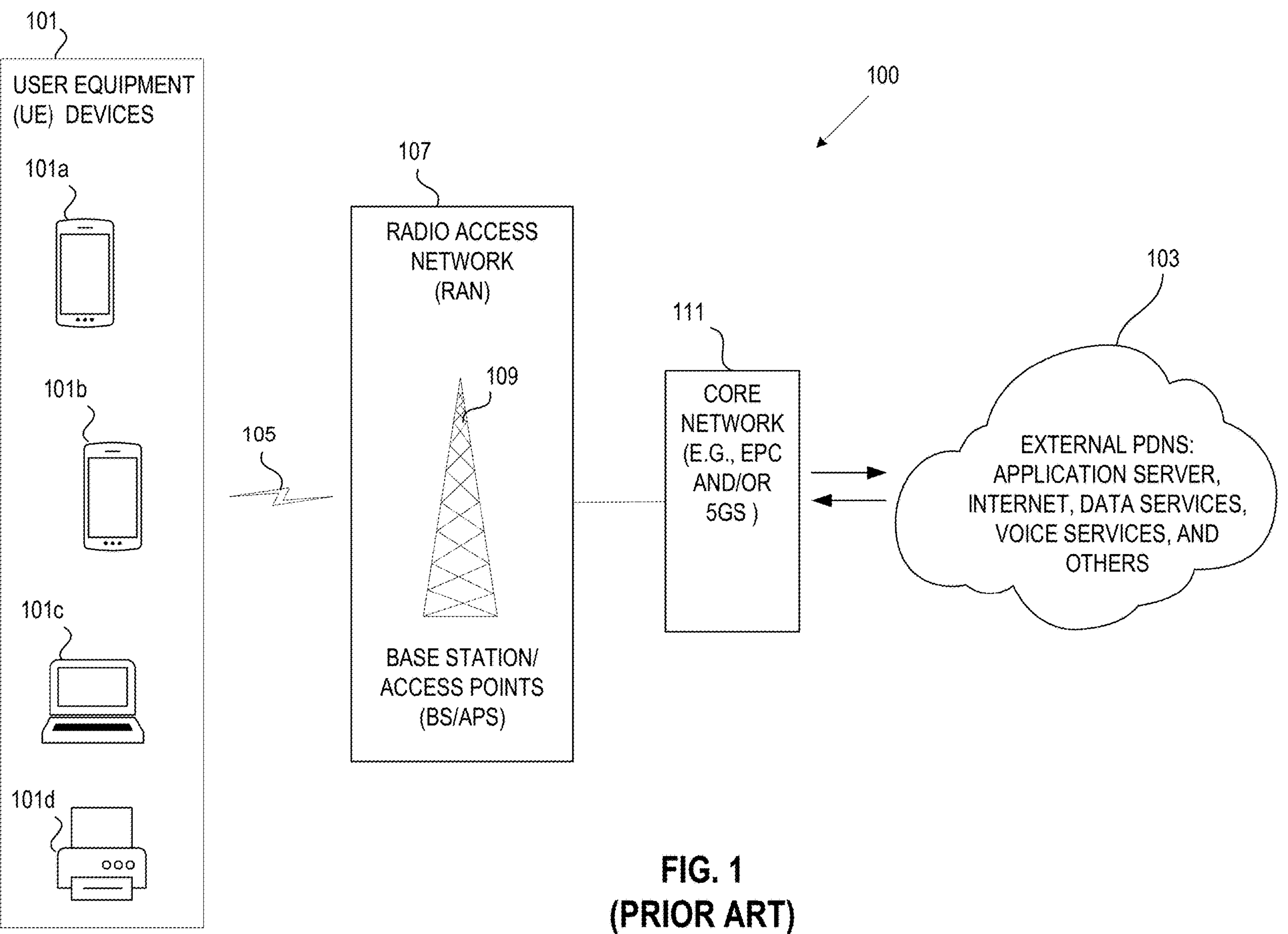
FIG. 1 is an illustration of a basic configuration for a communication network, such as a "4G LTE" (fourth generation Long-Term Evolution) or "5G NR" (fifth generation New Radio) network.
Figure 2:
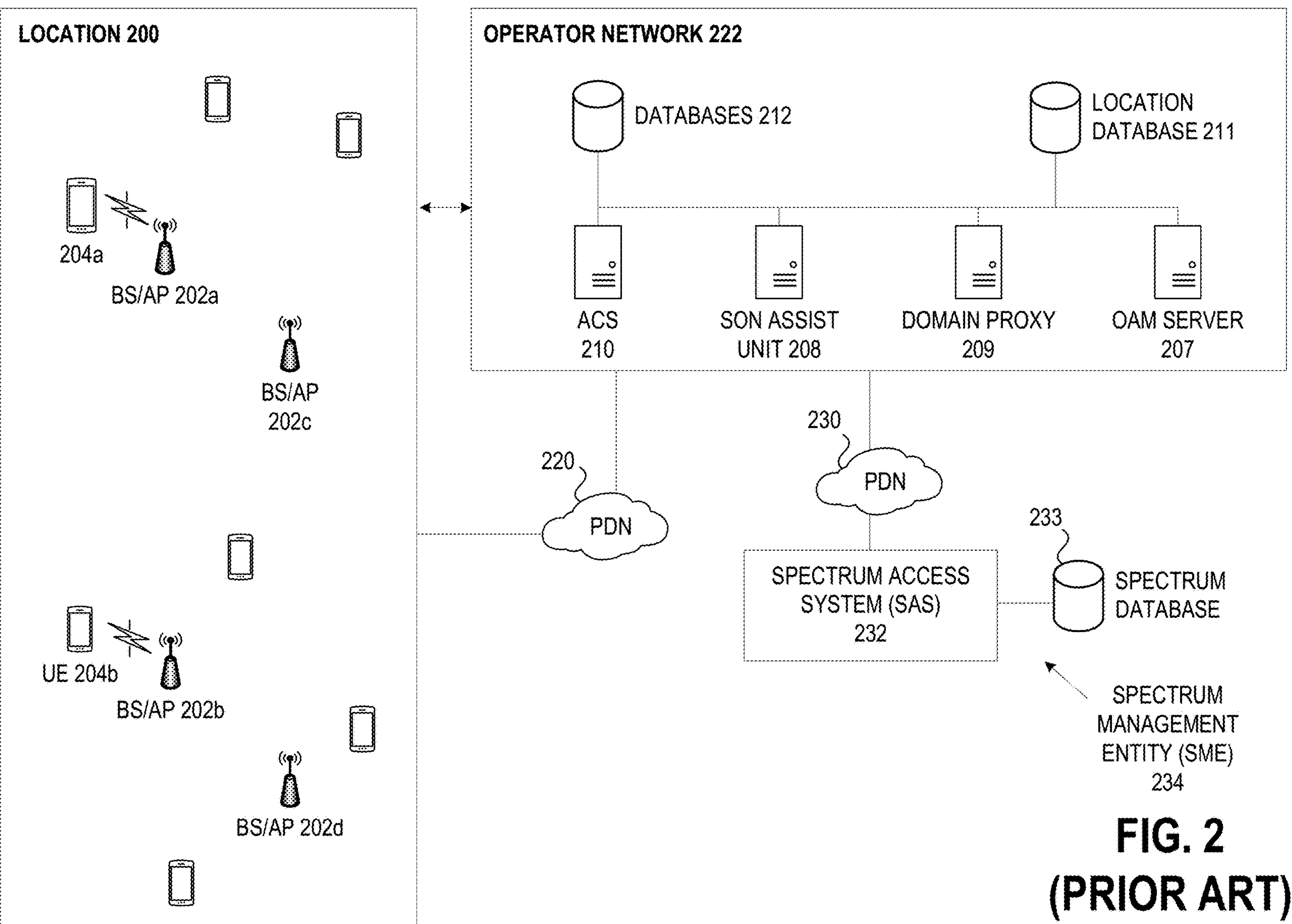
FIG. 2 is a diagram of a wireless communication network in which a CBRS system can be implemented, including BS/APs deployed at an enterprise location and UEs wirelessly connected to them.
Figure 3:
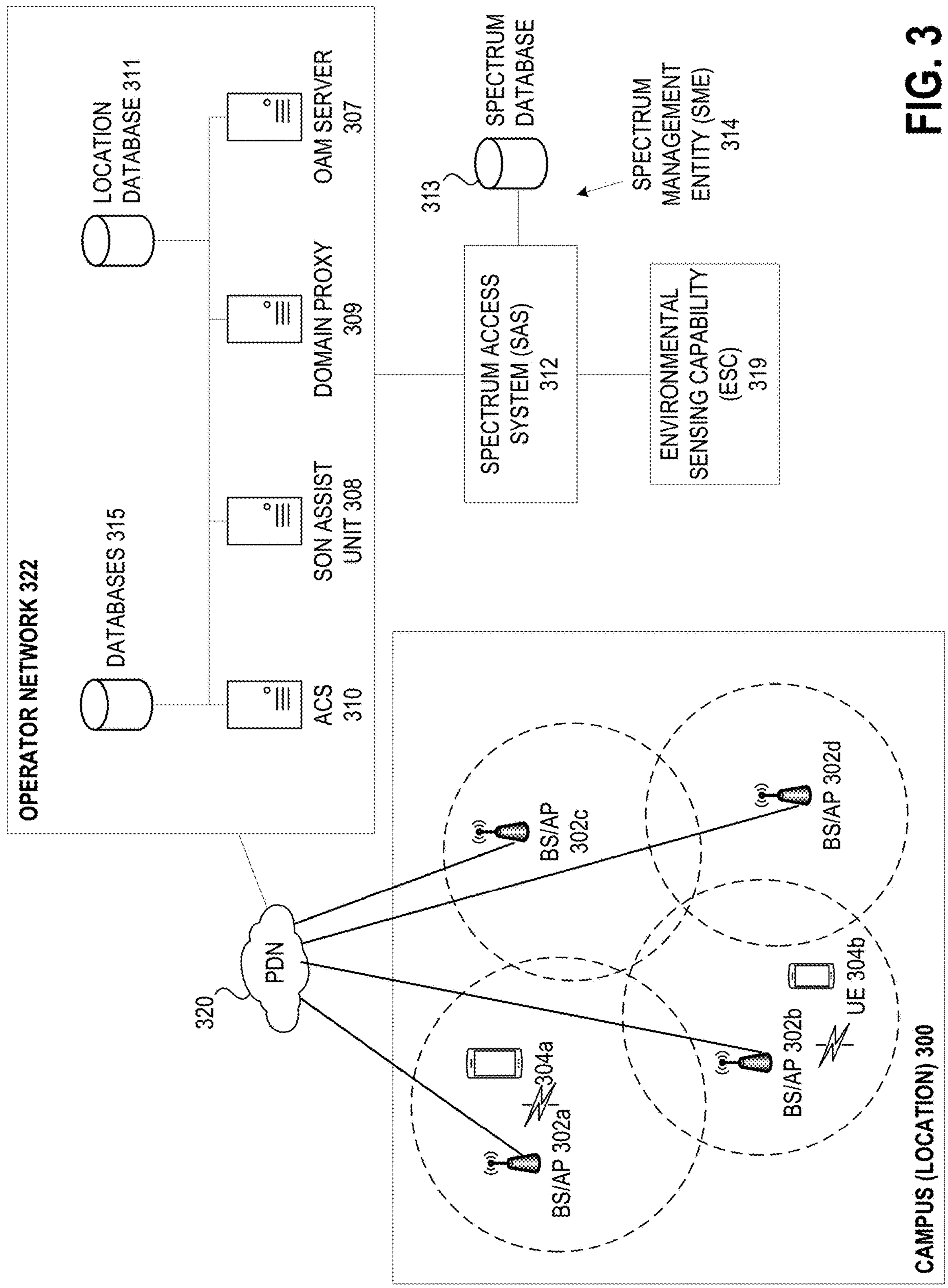
FIG. 3 is a diagram of a wireless communication network including an operator network connected to a Spectrum Management Entity (SME) and an enterprise network including a plurality of BS/APs deployed within an enterprise location.

FIG. 3 is a diagram of a wireless communication network in which the system described herein can be implemented. An enterprise wireless communication network (hereafter referred to simply as an "enterprise network" for brevity) includes a plurality of BS/APs 302*a*, 302*b*, 302*c*, 302*d* (collectively BS/APs 302), deployed in an enterprise location 300. In FIG. 3, each BS/AP has a range represented by the circle, which approximately represents its wireless coverage.

In one implementation, the network is a CBRS system, and the BS/APs may be CBSDs. A CBRS system is a spectrum-controlled system in which the CBSDs must be registered before operation in order to avoid interference with other users such as incumbent users that have higher priority to use the CBRS band. In alternative implementations, other network architectures and other technologies, such as mm wave, or spectrum purchased/licensed from others, could be utilized.

In FIG. 3, a first UE 304*a* is wirelessly connected to a first BS/AP 302*a*, which is providing service to it. A second UE 304*b* is wirelessly connected to a second BS/AP 302*b*, and is providing service to that second UE 304*b*. All the BS/APs 302 are connected to a PDN 320 by any appropriate communications means, such as wire, fiber optic, and wireless radio.

The PDN 320 provides a connection to an operator network 322 that includes an OAM Server 307, a SON assist unit 308, a Domain Proxy 309, an Automatic Configuration Server (ACS) 310 and a Location Database 311, all of which are connected to each other within the operator network 322 by any appropriate means.

In an enterprise network deployment, the BS/APs 302 will be located at an enterprise location, and it is very likely that the operator network 322 will be physically located at or near the enterprise location, especially in large or multiple deployments in the same area. However, for smaller deployments, or for multiple small deployments, it may be more cost effective to physically locate the operator network remotely from the enterprise location.

The operator network 322 is connected to a Spectrum Access System (SAS) 312, which is connected to a Spectrum Database 313 that includes data regarding the spectrum that it is managing. Collectively, the SAS 312 and the Spectrum Database 313 may be referred to as a Spectrum Management Entity (SME) 314.

In a typical network architecture, the enterprise BS/APs are not managed directly by a SAS but instead by the Domain Proxy 309. In this architecture, the Domain Proxy 309 registers all the enterprise BS/APs as a group with the SAS 312 and performs interference coordination. The set of available channels for use as indicated by the SAS are carefully assigned among the enterprise BS/APs such that there is negligible/nil interference, or as minimal interference as possible. To achieve this, the Domain Proxy may utilize any appropriate system such as self-organizing algorithms (in the SON unit 308).

The Domain Proxy 312 and the ACS 310 may also form an RF terrain map of the enterprise using information such as data from Radio Environment Monitoring (REM) results (network listening methods) from each BS/AP, GPS information from on-board GPS from the BS/APs or a combination of both. Such location information (REM and GPS/cartesian coordinates) are maintained in Location database 311. Knowing the RF terrain, the Domain Proxy 312 and SON Unit 308 can determine and allocate an optimal channel for each BS/AP to keep the interference to a minimum.

The SAS 312 may be connected to an Environmental Sensing Capability (ESC) 319, which monitors the spectrum over a wide area and notifies the SAS 312 that an incumbent (such as a navy ship) or other interfering source may soon be near the enterprise location or another location being served by the SAS 312.

The configuration of channels on the BS/APs and fetching of REM results/GPS coordinates from the BS/APs are performed over an OAM interface, for example TR069 or SNMP provided by the OAM server 307. The OAM server 307 provides a variety of functions. According to the IETF definition of OAM (RFC 6291 definition) the components of the "OAM" acronym are defined as follows:

Operations—Operation activities are undertaken to keep the network (and the services that the network provides) up and running. It includes monitoring the network and finding problems. Ideally these problems should be found before users are affected.

Administration—Administration activities involve keeping track of resources in the network and how they are used. It includes all the bookkeeping that is necessary to track networking resources and the network under control.

Maintenance—Maintenance activities are focused on facilitating repairs and upgrades—for example, when equipment must be replaced, when a router needs a patch for an operating system image, or when a new switch is added to a network. Maintenance also involves corrective and preventive measures to make the managed network run more effectively (e.g., adjusting device configuration and parameters).

FIG. 3 is one example of a wireless communication network in which the system described herein can be implemented, other implementations are possible.

(4) Quality of Service (QoS)

Quality of Service (QoS) relates to communication qualities that may be assigned by a network to a UE for use during a communication session across the network. Different applications have different requirements, and in order to provide an appropriate level of service for different applications, the radio control system must have the capability to vary QoS quantities in order to provide the appropriate QoS. QoS selection allows the radio control unit to assign different priorities to packets of different applications, users, or data flows, or to guarantee a certain level of performance to a data flow.

QoS can be defined by a combination of one or more quantities such as a required bit rate, delay, delay variation, packet loss, or bit error rates. The radio controller may guarantee a particular QoS for a particular application; for example, a required bit rate, delay, delay variation, packet loss, or bit error rates may be guaranteed. An appropriate QoS is important for any wireless service, particularly real-time streaming multimedia applications such as voice over IP, multiplayer online games, and IPTV, since these often require fixed bit rate and are delay sensitive. Furthermore, QoS is especially important in networks where the capacity is a limited resource, for example in cellular data communications.

A network or protocol that supports QoS for its users may agree on a traffic contract with the application software and reserve capacity in the network nodes, for example during a session establishment phase. During the subsequent session the network may monitor the achieved level of performance, for example the data rate and delay, and dynamically control scheduling priorities in the network nodes.

(5) Artificial Intelligence

Artificial Intelligence (AI) techniques are utilized herein. One definition of the AI field is the study of "intelligent agents" which include any devices that perceive their environment and take actions maximizing their chances of successfully achieving their respective goals. The term "artificial intelligence" describes machines (or computers) that have learning and/or problem solving capabilities.

"Automated planning and scheduling", sometimes referred to as simply "AI planning", is a branch of artificial intelligence that develops and implements strategies or action sequences, for execution by, for example, intelligent agents, autonomous robots, and unmanned (self-driving) vehicles. Unlike classical control and classification problems, the solutions are complex and are typically discovered and optimized in multidimensional space. AI planning may also be related to decision theory. In known environments with available models, AI planning can be done offline. Solutions can be found and evaluated prior to execution. In dynamically unknown environments, the strategy often needs to be revised online. Models and policies must be adapted. Solutions usually resort to iterative trial and error processes commonly seen in artificial intelligence, which may include dynamic programming, reinforcement learning and combinatorial optimization. Languages used to describe planning and scheduling may be called action languages.

"Data mining" as used herein is a broad term for mining the data for information, utilizing exploratory data analysis through unsupervised learning and recognition of patterns. The patterns found by data mining may be easily observable by rote learning and memorized, repeated occurrences, or they may be much more complicated. Machine Learning (ML) is a more specific type of data mining in which the patterns to be recognized may be hidden and difficult to find.

Machine learning (ML) is the study of computer algorithms that improve automatically through experience. It is seen as a subset of artificial intelligence, and there are many types and methods of machine learning, any of which can be implemented herein as appropriate. Methods of machine learning include classification, regression, and clustering, and others. Classification machine learning methods may build a model based on sample data, known as "training data", in order to make predictions or decisions without being explicitly programmed to do so. Regression methods fit the data to a curve or function. Clustering methods use techniques to find a centerpoint and define clusters (e.g., place dots on a screen to define a number and size of clusters).

Deep Learning: Deep learning is a subset of machine learning. In one implementation multi-layered neural networks—modeled to work like the human brain—'learn' from large amounts of data. Within each layer of the neural network, deep learning algorithms perform calculations and make predictions repeatedly, progressively 'learning' and gradually improving the accuracy of the outcome over time. In the same way that the human brain absorbs and processes information entering the body through the five senses, deep learning ingests information from multiple data sources and analyzes it in real time.

In summary, machine learning is a subfield of artificial intelligence. Deep learning is a subfield of machine learning, and neural networks make up the backbone of deep learning algorithms. The number of node layers, or depth, of neural networks distinguishes a single neural network from a deep learning algorithm, which may have more than three node layers.

(6) Overview

A system is disclosed herein for anticipating and controlling the load on the radio link in a wireless communication network. Some embodiments include a method of proactively controlling the wireless communication load in an enterprise network situated in a campus location that includes several BS/APs wirelessly communicating with at least one UE on the campus. One purpose of load control is to provide appropriate service to all UEs attached to the BS/APs in the network. Particularly, data is collected over time, the busy hours (times) in the day are recognized (in one embodiment they are recognized as a time series of events), predictions are made regarding when busy times are likely to occur (or when the time series of events happen), and resources are allocated proactively, such as re-allocating transmit power among the BS/APs and restricting QoS grants to the UEs to allow more users to be supported in the system.

As described herein, data is collected on an BS/AP basis to identify the peak time periods, and more generally traffic variations over time. Predicted heatmaps, as a function of time and/or as a time series of events, are identified using ML techniques; particularly ML methods, such as deep learning are performed to develop predicted heatmaps associated with regions of the campus. Also, the peak time periods and traffic variations over time tend to reflect the trends of population movement on the campus, and from these population movements, ML techniques are used to estimate the ability to defuse communication congestion by offloading traffic to neighboring BS/APs or other networks that may be available, such as Mobile Network Operator (MNO) networks.

Also, the footprint of the enterprise's Wi-Fi network relative to the BS/APs in the enterprise network and the loading on that system can be monitored to make a collective decision. Responsive to this information, AI Planning techniques can be applied to determine pre-emptive steps to prevent users from attaching to the enterprise network, possibly direct them to the Wi-Fi network, and therefore reduce the possibility of overloading.

Artificial Intelligence (AI) systems are implemented, based upon any or all of the heatmaps, the estimated ability to defuse congestion by offloading traffic, and preemptive steps to prevent users from attaching to the enterprise network. The AI systems are implemented to monitor and anticipate congestion in the enterprise network and respond proactively and appropriately using any of the techniques described herein to control the BS/APs and the network to reduce congestion or otherwise ensure that service needs of the UEs are met. Any or all of the AI techniques, including AI Planning, data mining, machine learning, and deep learning may be implemented and performed on site (on-line), or remotely (off-line); but preferably the AI modules are located on-site, where the enterprise network can learn its own patterns of behavior without requiring outside resources.

(7) Monitoring BS/AP Traffic Usage Over Time.

Figure 4B:
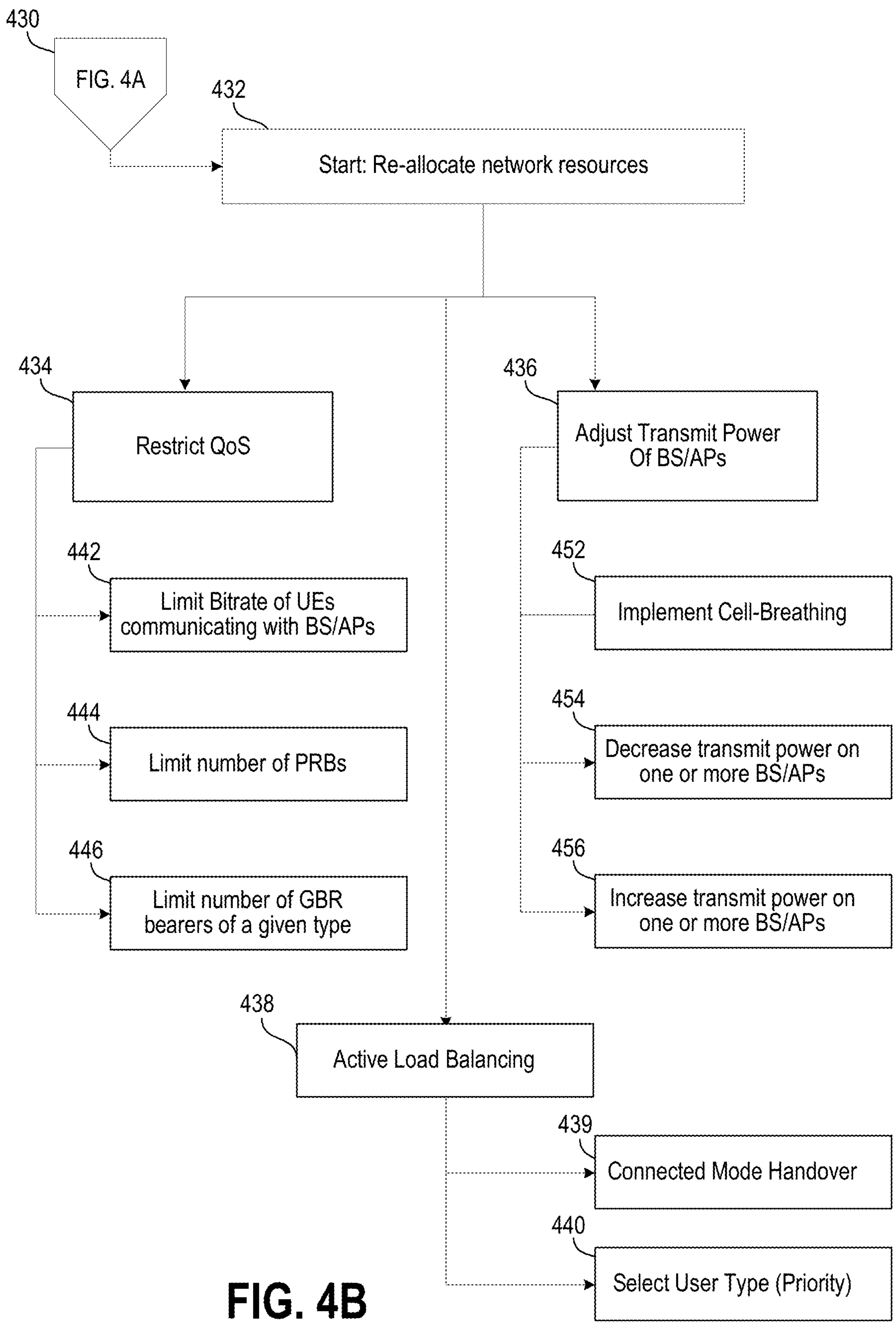

FIGS. 4A and 4B are flow charts that combine to show operations to learn busy times in a wireless communication network and anticipate and control the load on the radio link to provide service to the UEs attached to the BS/APs. After starting operation to control load, based upon predicted congestion (STEP 400), the RAN, and more particularly, each BS/AP begins monitoring communication traffic over a period of time to determine, among other things in some embodiments, usage and service data for the BS/APs 511 (STEP 402). Particularly, the channel occupancy at each BS/AP can be measured. To measure channel occupancy, measurements can be made of the total Physical Resource Block (PRB) traffic at each BS/AP, and/or the PRB traffic with each UE, to determine the usage at each of the BS/APs in the network. The PRBs are defined according by the network architecture (e.g., in LTE a PRB is the smallest unit of resources that can be allocated to a user, which can be one slot long in time and 180 kHz wide in frequency).

The resulting channel occupancy data (STEP 404) provided from the previous step can be collected over time for each BS/AP by monitoring the PRBs associated with each BS/AP at the RRC scheduler. The data is typically measured on a periodic basis with intervals short enough to capture whatever bursts of activity occur, without collecting excessive amounts of data. The interval can be selected based upon the particular deployment; for example, the intervals could be short (e.g., 30 seconds or 2 minutes) or longer (e.g., 10 minutes or one hour). The intervals should be short enough to capture the identify bursts of activity, such as the time between classes on a college campus.

In addition to the collected channel occupancy data, it can be useful to know the location of the BS/APs and the UEs, the geography of the campus and the placement of the BS/APs within the campus, the specifications (e.g., capacity) of each BS/AP, and other information relevant to communication usage and capabilities of the wireless network.

(8) Identify Congestion Hotspots (STEP 406)

The channel occupancy data 404 can then be used to identify congestion hotspots (STEP 406). This can be done by analyzing the data and observing which of the BS/APs becomes congested at which times. The data can be analyzed using conventional AI techniques, such as AI planning to proactively re-allocate resources and balance the number of users with the level of service supported with the network resources available. Accordingly, data mining the channel occupancy data can be performed to identify congestion hotspots as a function of time. Alternatively, or in addition, ML can be used to predict heatmaps for individual BS/APs and to recognize demand patterns for services. Thus, the peak traffic time periods and other congestion can be identified on an BS/AP basis, as a function of day-of-the-week and time-of-day, and/or as a time-series of events. If the BS/AP locations and campus map (DATA 408) is known, the identified congestion hotspots can be mapped on a geographical basis across the campus.

(9) Create Heatmaps of Usage Over Time (STEP 410)

The channel occupancy data, and any other relevant data (such as usage and service data) from monitoring the BS/APs, is processed (STEP 410) using data mining, machine learning, and/or deep learning techniques to create heatmaps that include BS/AP usage and communication congestion across the campus as a function of time or a time-series of events. The data is processed responsive to the congestion identified and the population movement as a function of time based on the day-of-the-week and time-of-day. Particularly, using the BS/AP locations and campus map data 408, heatmaps associated with regions of campus are generated that provide predictions showing where communication is likely to be adversely impacted by congestion, and the extent of that congestion as a function of time or as a time-series of events. In some embodiments, usage and service data includes location data, and the usage and service patterns include location in a time-series of events. In some embodiments, responsive to the congestion hotspots and the channel occupancy data, data mining is performed to create the heatmaps of BS/AP usage over time and to make congestion predictions as a function of time.

By observing the heatmaps sequenced over time, trends and patterns of population movement on campus can be seen, which may be repeated each day, or week, for example. These patterns may be useful in predicting congestion and proactively responding to it.

(10) Estimate the Ability to Defuse the Congestion (STEP 412)

The information in the heatmaps, including the predicted congestion and population movement patterns over time are then processed (STEP 412) using Artificial Intelligence (AI) techniques such as automated scheduling and planning (AI planning) to consider possible approaches by the wireless network and develop viable responses to proactively defuse the predicted congestion utilizing one or more of these approaches. In some embodiments, responsive to predicted congestion, use artificial intelligence (AI) planning is used to determine a plan for the network to reduce the predicted congestion by at least one of re-allocating resources, refusing admission of new UEs, and offloading UEs to other networks Accordingly, one approach to defuse the predicted congestion is refusing admission of one or more UEs into the network. This approach, which denies service to UEs that may expect to connect to the network, is simple to implement in some situations, but may not be preferable in other situations.

Other approaches to defusing congestion may be available and can be considered. One approach to defusing predicted congestion is to allocate resources to a given BS/AP in a way that allows a larger number of UEs to communicate with the BS/AP. For example, in one embodiment, resources can be allocated to a given BS/AP by restricting, adjusting and/or controlling the Quality of Service (QoS) provided by the BS/AP to the UEs to which it is attached. The QoS may be adjusted for those BS/APs currently attached, and for those requesting services, the new QoS grants can be reduced to allow a larger number of UEs to communicate.

Another approach is to transfer the load from the center of congestion by adjusting the transmit power of the BS/AP and its neighboring BS/APs to offload currently-attached UEs to one or more of the neighboring BS/APs; particularly, to reduce the transmit power on one BS/AP and increase the power on one or more nearby BS/AP(s) to transfer a load from the predicted center of congestion. a technique that may be called "cell-breathing".

Another approach is to direct a handover of an attached UE from the BS/AP to a neighboring BS/AP, as part of an approach that is called "active load balancing". In this approach, a connected mode handover controlled by the network transfers communication of an attached UE from one BS/AP to another BS/AP, even though that transfer may lower the QoS. In some embodiments the load balancing approach is performed selectively based upon the user type, allowing for different behaviors. For example, higher priority users such as campus executors/administrators may be given a higher priority to stay on a BS/AP than a regular employee, a student, or a visitor. As another example, a user with a higher security level may be given a higher priority than one with a lower security level.

Still another approach is to offload specific user flows, or one or more IP address(es), or all traffic of some of the currently attached UEs from the enterprise network to another network, such as an available Wi-Fi network (which may be a WiFi network operated by the enterprise), which usually requires creating a new PDN connection and transferring user flows to a new IP address. Wi-Fi allocates an IP address through the DHCP (Dynamic Host Configuration Protocol). The Internet connectivity is typically directly supported over this Wi-Fi assigned IP address. PDN connections can be moved over from LTE/NR to Wi-Fi establishing them as IPSec tunnels into an MNO core. To offload to Wi-Fi networks, one or more of the UEs are (or have been) allocated an independent IP address, typically through DHCP, for data communication over the Wi-Fi network. The Wi-Fi assigned IP addresses generally support internet connectivity. The enterprise network PDN connections can be moved from the enterprise (LTE/NR) network to operate over the Wi-Fi assigned IP address as tunneled connections into the MNO core. Traffic can be transitioned between the IP address on enterprise (LTE/NR) to the one provided on Wi-Fi or the PDN connection established as IPSec (Internet Protocol Security) tunnels on top of the Wi-Fi IP address. More broadly, all traffic on a specific IP address may be transferred, or all traffic through a specific port can be transferred, or multiple IP addresses, or multiple ports may be transferred. Specific flows may be transferred, for example in streaming, the video flow may be transferred to WiFi, while the audio remains on the enterprise network. Many different types of data flows can be transferred (e.g., offloading data flows), such as voice, video, background traffic, streaming traffic, and IOT traffic. Accordingly, the UE may be communicating simultaneously with the enterprise network and the WiFi network.

Based upon the type of flow, a decision may be made whether or not to offload to a WiFi network based upon the type of service and QoS requirements, for example a voice call may be kept on the higher QoS enterprise network and video traffic may be offloaded to the WiFi network. As one example of transferring a flow, if the footprint of the Wi-Fi network is known, then based on the understanding the footprint of the Wi-Fi network relative to the BS/AP and/or UE, and the loading on that system, offloading the attached UE, e.g., by dropping the UE from the enterprise network, and anticipating that it is either currently attached to the Wi-Fi network, or will attach when dropped from the enterprise network. Particularly, the footprint of the Wi-Fi network relative to the BS/APs in the enterprise network and the loading on that system can be monitored to make a collective decision. Responsive to this information, ML techniques can be applied to determine pre-emptive steps to prevent users from attaching to the enterprise network, possibly direct them to the Wi-Fi network, and therefore reduce the possibility of overloading.

(11) Proactive Network Action

A network action is then chosen (STEP 420) and is implemented proactively; i.e. at a time prior to the predicted congestion, for the purpose of reducing congestion and providing appropriate service levels to the UEs. The network action may include any of the approaches described herein, or a combination of the approaches. In other words, a collective decision (STEP 420) is made regarding how to proceed, and this action is taken before the congestion is predicted.

After the decision (STEP 420), in order to proactively control the network load and avoid service interruptions, the network can take action on any combination of the following: 1) take preemptive steps to prevent additional UEs from attaching to the enterprise network (STEP 422), 2) offload data flows currently-attached UEs to other networks (STEP 424), and 3) re-allocate resources among UEs already attached to the network (STEP 430).

Offloading data flows (STEP 422) may include offloading one or more data flows, or all traffic with the UE. It may include transferring one or more IP addresses, or one or more ports to the other network. It may include splitting an IP address between the enterprise network and the other network. After offloading some flows, the UE may be communicating with both the enterprise network and the other network.

Resource allocation operations (STEP 430) are shown in FIG. 4B. At the start of resource allocation (STEP 432), a decision made in the previous steps (how to allocate resources) will be implemented. Resource allocation has multiple mechanisms, any of which can be utilized, for example: 1) restricting the QoS of the wireless connections with the UE (STEP 434), 2) controlling the transmit power of the BS/APs (STEP 436) (e.g., cell-breathing) and 3) active load balancing (STEP 438).

The step of restricting the QoS resource allocation for each BS/AP (STEP 434) can be accomplished in a number of ways. The restrictions can be to limit:

- the bitrate granted for a QoS bearer of certain type (STEP 442); for example, the bitrate can be restricted to 720 kbps;
- the number of PRBs for a particular BS/AP (STEP 444);
- the number of GBR bearers of a given type (STEP 446); or
- the grants to the BS/APs.

Another way to allocate resources is to adjust BS/AP's transmit power (STEP 436). The preferred mechanism to adjust BS/APs' transmit power is to allow for "cell-breathing" to regulate users camped on a BS/AP. Cell-breathing is a mechanism that allows overloaded BS/APs to offload subscriber traffic to neighboring BS/APs by changing the geographic size of the BS/AP's service area. One cell breathes in (transmit power reduces, footprint and coverage gets smaller) another cell breathes out (transmit power increases, footprint and coverage gets larger). Heavily-loaded cells decrease in size, while neighboring cells increase their service area to compensate for the decreased size of the heavily-loaded BS/APs. Thus, some traffic will be handed off from the overloaded BS/AP to neighboring BS/APs, to balance the load across the network.

Still another way to allocate resources is by active load balancing (STEP 438) by the enterprise network to distribute the load and prevent service disruptions. Active load balancing operation includes a connected mode handover (STEP 439) controlled by the network, in which communication of an attached UE is transferred from one BS/AP to another BS/AP, even though that transfer may lower the QoS. In some embodiments the load balancing approach is performed selectively based upon the user type (STEP 440), allowing for different behaviors. For example, higher priority users such as campus executors/administrators may be given a higher priority to stay on a BS/AP than a regular employee, a student, or a visitor. As another example, a user with a higher security level may be given a higher priority than one with a lower security level The identified congestion hotspots, heatmaps, and restrictions, can be implemented across the full enterprise system, and/or for each cell in the system.

After the congestion period is over, the actions taken to address the congestion can end (STEP 428), the network resources can be reallocated by the network, and new UEs can be admitted as appropriate for the network to provide appropriate service levels to the UEs to which the BS/APs are attached.

During operation, network performance and congestion are monitored to provide feedback to the AI system. Accordingly, by monitoring network operations to allow re-allocation of network resources proactively in response to usage and service patterns, congestion can be avoided and appropriate service provided to several UEs. For example, new performance data can be compared and/or combined with the previous data and new learning can be performed. Also, reinforcement learning techniques can be implemented using the new data and historical data to improve the AI system and thereby improve network performance.

Figure 5:
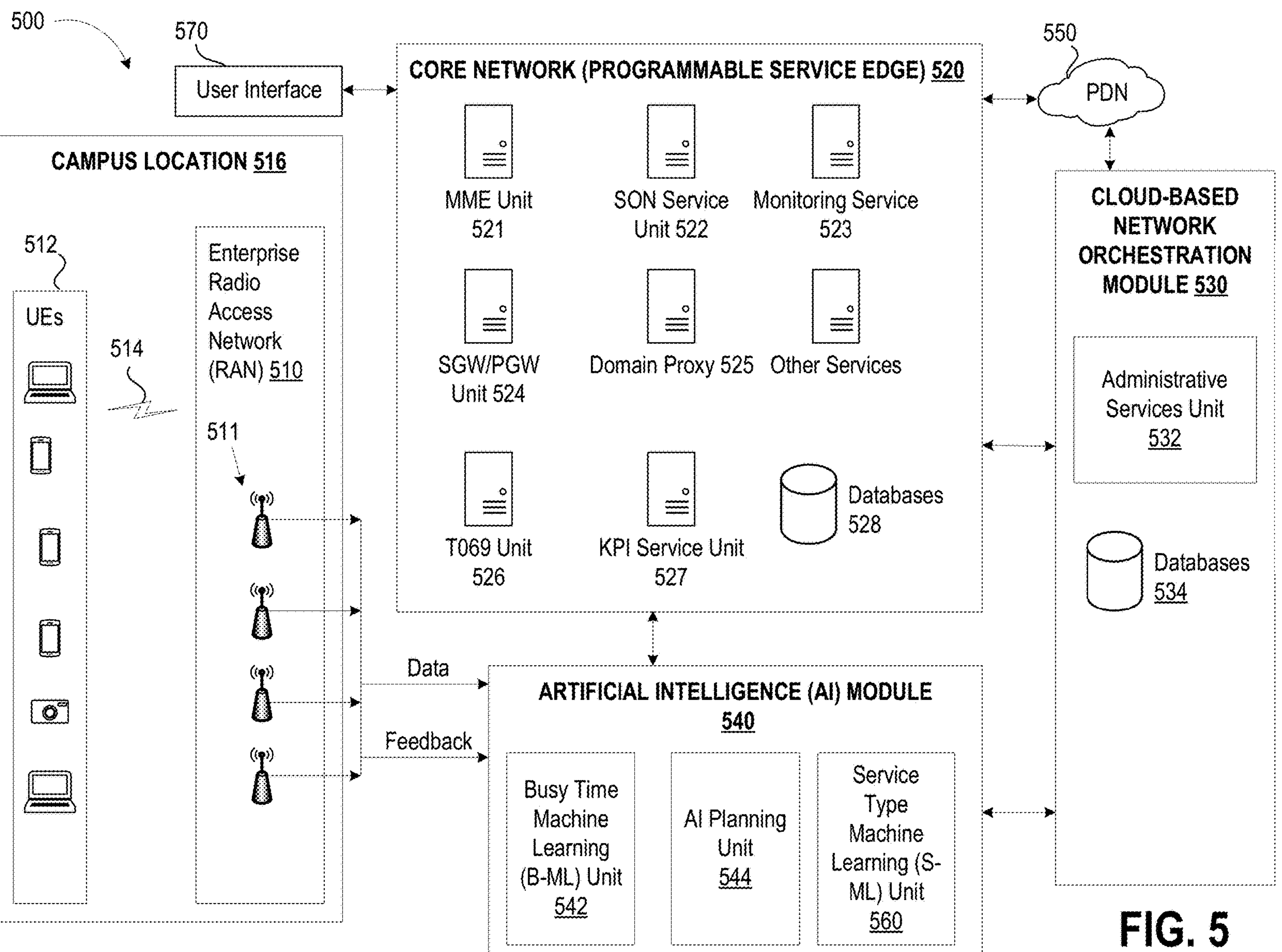
FIG. 5 is a block diagram of an implementation of an enterprise network that includes an Artificial Intelligence (AI) module, Machine Learning units, and an AI Planning unit.

(12) FIG. 5 Block Diagram

FIG. 5 is a block diagram of an implementation of an enterprise network 500 that implements the techniques described herein. The enterprise network 500 includes a radio access network (RAN) 510 that includes a plurality of BS/APs 511 that wirelessly communicate with a plurality of UEs 512 over a wireless link 514. The BS/APs 511 are installed in a campus 516, and the UEs 512 are present in or around the campus 516 to wirelessly communicate with one or more of the BS/APs 511.

Data collected from the BS/APs 511 is supplied to an Artificial Intelligence (AI) Module 540 that includes a Busy Time Machine Learning (B-ML) Unit 542 and an AI Planning Unit 544. As discussed elsewhere, the data may include channel occupancy data, which is indicative of the load being experienced by the BS/APs 511. Data can be collected in batches and history-based learning and/or ML techniques performed on the batch of data, and then implemented. Alternatively, or after initial learning using batches of data, data can be collected periodically or nearly continuously in real time and learning and ML can be implemented automatically (e.g., 5-minute intervals) to continually improve the models and thereby continually improve network performance.

The AI module 540, the B-ML Unit 542, and the AI Planning Unit 544 include appropriate circuitry to identify and learn busy time periods, consider options, choose actions, and determine when to perform the actions. AI systems are implemented, based upon any or all of the heatmaps, the estimated ability to defuse congestion by offloading traffic, and preemptive steps to prevent users from attaching to the enterprise network. The AI systems are implemented to monitor and anticipate congestion in the enterprise network and respond proactively and appropriately using any of the techniques described herein to control the BS/APs and the network to reduce congestion or otherwise ensure that service needs of the UEs are met. The AI module 540 is connected to the core network 520 and supplies the results of its learning and other information the core network 520, which in response directs and controls the BS/APs to proactively respond to predicted congestion.

The AI Module 540 also receives feedback from the BS/APs 511. Particularly, network performance and congestion may be monitored to provide feedback to the AI system. For example, new performance data can be compared and/or combined with the previous data and new learning can be performed. Also, reinforcement learning techniques can be implemented using the new data and historical data to improve the AI system and thereby improve network performance.

In the illustrated embodiment, the enterprise network 500 includes a core network 520 (also called a Programmable service edge or "PSE") that provides a variety of services for the network, and a cloud-based network orchestration module 530 that provides administrative services 532, databases 534, and other functional units such as machine learning and artificial intelligence units. The core network 520 includes a plurality of components that provide services for the network, including an MMF (Mobility Management Function) unit 521, a SON (Self Organizing Network) service unit 522, a monitoring service unit 523, an SGW/PGW (Serving Gateway/Packet Data Network Gateway) unit 524, a domain proxy 525, a TR069 unit 526, and a KPI (Key Performance Indicator) service unit 527. The core network 520 may also include databases 528 and other units for additional network services as required or useful. In some implementations, the AI module 540 may be implemented as part of the core network module 530.

In some embodiment the core network 520 is connected to a cloud-based network orchestration module 530. The core network 520 and the orchestration module 530 may be connected via a Packet Data Network (PDN) 550. The cloud-based orchestration components 530 includes an Administrative Service Unit 532 for remote administration of the enterprise network, databases 534, and other components as may be necessary or useful. In some implementations, the AI module 540 may be implemented as part of the orchestration module 530.

(13) Managing Network Resources Based on Service Types

Many mobile devices (UEs) are simultaneously in use on campus locations, and many different application and services are popular and concurrently operating. Due the large number of UEs on campus locations, and coinciding schedules (e.g., breaks, lunch) that cause many people to make calls and access services around the same time, a strong possibility arises that the wireless system that supports these UEs will become overloaded at certain times and places. A system is described herein that learns service demand patterns and proactively adjusts network resources based upon service policies and preferences, to minimize service disruptions that may otherwise occur. In some embodiments, these adjusting network resources includes adjusting QoS parameters and/or bitrate resource allocation based on recognized and predicted demand for a given service.

Examples of services that can be provided by a wireless network include:

voice calls,
web browsing,
downloads of document or other information
video (e.g., YouTube),
social media (e.g., Facebook, Twitter),
video security cameras, sensors, and many others.

Any of these services may be requested by UEs, and most users expect to have access to services when requested or shortly thereafter, with at least an acceptable level of service. During the process of connecting to the network the UEs often indicate to the wireless network the type(s) of services that they are requesting. Based upon the service type, the wireless network can assign a certain Quality of Service (QoS) to the UE for its session.

Figure 6:
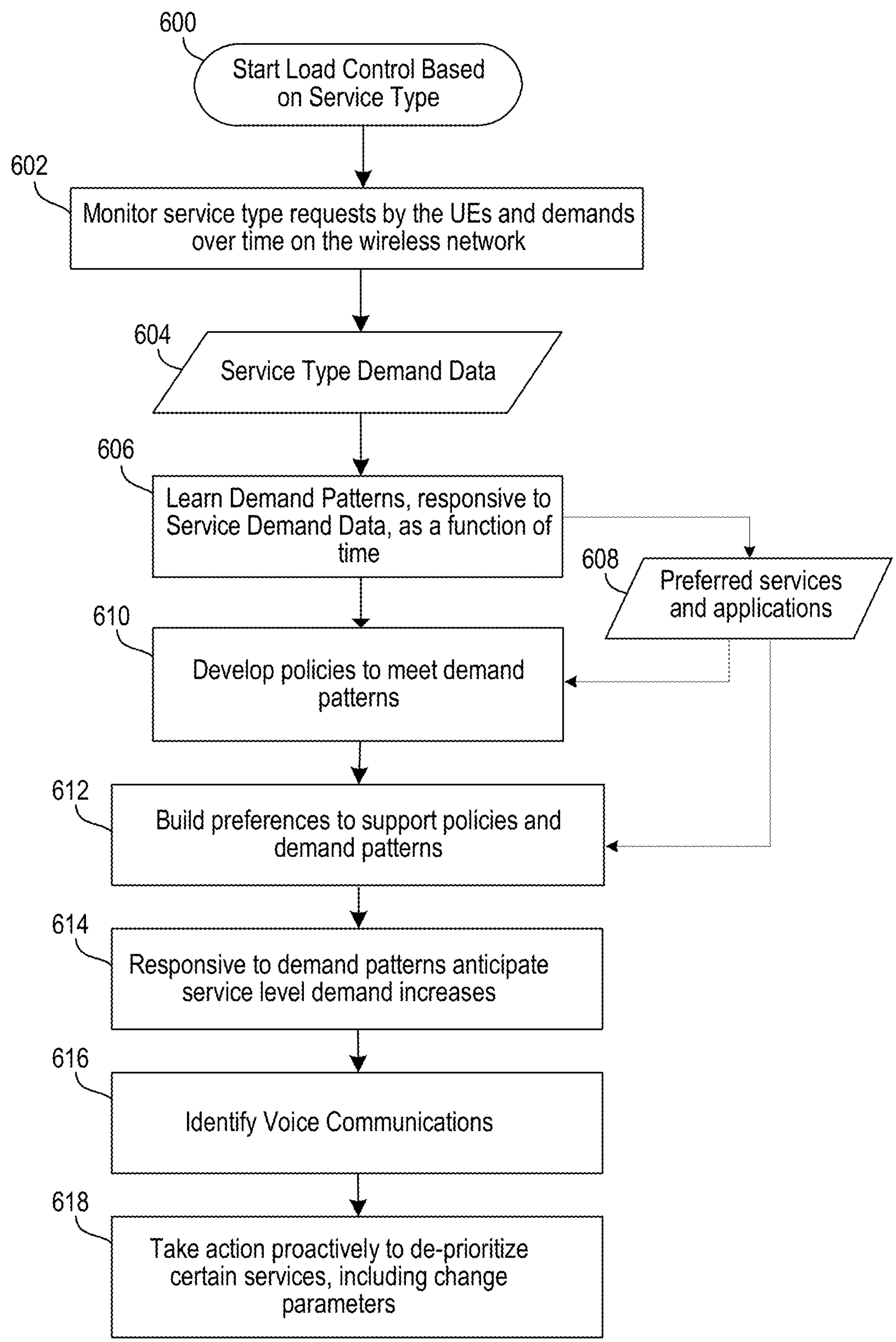
FIG. 6 is a flow chart of operations to learn service type patterns in a wireless communication network at a campus location, anticipate service requests, and control the services on the radio link to efficiently utilize network resources.

FIG. 6 is a flow chart of operations to learn service type patterns in a wireless communication network at a campus location, anticipate service requests, and control the services on the radio link to efficiently utilize network resources and provide appropriate service to as many UEs as possible. After starting operation (STEP 600), the network begins monitoring service type requests by the UEs and the demands of those requesting (STEP 602). Particularly, the numbers of each service type can be measured, including when the request was received, the type of service, the approximate location of the requesting UEs, the session time, and the BS/AP attached to the UE. Typically, this service type data (DATA 604) is collected in the core network 520, for example in the databases 528.

(14) Recognize/Learn Demand for Services Using Machine Learning, Responsive to Service Data, The service type data 604 is then supplied from the core network 520 to the Service Type Machine Learning (S-ML) Unit 560 in the AI Module 540 to learn the demand patterns for each service type as a function of time (or as a time-series of events), using any appropriate data mining, machine learning, and/or deep learning techniques. For example, the demand patterns for service types based on day-of-the-week/time-of-day can be learned and recognized. From these demand patterns or other information, preferred service and applications can be defined (DATA 608). Accordingly, in some embodiments, the RAN that includes the plurality of BS/APs 511 performs data mining of the usage and service data to detect usage and service patterns.

(15) Develop Enterprise Policies and Preferences to Meet Predicted Service Demands.

Responsive to demand patterns, and the preferred services and application, policy configurations can be created (STEP 610) for better supporting the preferred applications on the campus Preferences can be built (STEP 612) based on the learned information to adjust the parameters of both the application and the service based on the day/time, or a time-series of events. Following these preferences allows better regulation of the types of services that are admitted to the system, making the network more usable. These policies and preferences can be created and developed in the AI Planning Unit 542 in the AI Module 540 and stored in databases 528 in the core network 520, or in any suitable location.

In one embodiment, a User Interface (UI) 570 is provided, connected to the core network 520, which can be used by the managing entity (e.g., an IT administrator), to manually select and re-define the preferences and policies of the enterprise network. This UI 570 allows the managing entity to change preferences and policies as needed or useful, which allows the enterprise to selectively throttle certain services and users (i.e., completely stop use reduced bit rates, or increase bit rates for certain services and users on one or more BS/APs), while giving other users priority. The services that can be selectively throttled include, for example, broadcast and multicast services. The services can be throttled at any time, for example throttling can be performed midstream. Throttling can be performed as a renegotiation of the current session that can be triggered if the QoS is reduced, or if more resources become available. Although not preferred, as an alternative the current session can be terminated, and then set up with different bitrate or QoS.

In some scenarios it is possible for a given user to be allowed certain services while other less preferred services are blocked. Unfortunately, blocking users' services is a denial of service that should be avoided under some circumstances; to address this, in some implementations certain users can be provided priority (e.g., by providing different levels of service for different classes of users such as gold, silver, bronze levels). For example, a user who is giving a presentation on campus in front of a group of people can be given a higher level of service. User service levels could be provided in the enterprise policy configuration.

In some instances, moving the UE to the MNO would be a better option for the UE. The Service Level Agreement (SLA) is negotiated using multi-dimensional parameterization with the managing entity establishing the allowed ranges, and these ranges could be implemented in the policies.

(16) Parameters Controlled

To establish preferences, some of the dimensions (parameters) to be considered include:

- ranges in the allowed QoS parameters,
- voice bit rate,
- other bit rates (e.g., security camera bit rate, web browsing),
- restrict the numbers of users supporting a given service (set to minimum),
- region(s) of the network,
- day-of-the-week,
- time-of-the-day, and
- using scheduler efficiency to define the relative priority of the particular service. Although it is not possible to directly control bit rates of many services (e.g., YouTube videos), the bit rate for a service can by indirectly changed by reducing the scheduler efficiency for the particular service or source (server) of a service, which de-prioritizes traffic (reduces priority), which causes the end-to-end efficiency of the service to automatically change (e.g., if students are taking a test, that server can be prioritized in the scheduler, which then de-prioritizes other services naturally, so that resources become available for the higher-priority services).

The User Interface (UI) 570, which is connected to the core network 520 and provided to the managing entity (e.g., an IT administrator), allows selection of these parameters, as well as select preferences and policies. Using the UI 570 the managing entity can change preferences and policies as needed or useful, to allow the enterprise to selectively throttle certain services and users.

Responsive to learned service demand patterns, policies, and preferences of a particular enterprise network, an increase in services can be anticipated (STEP 614) in, e.g., the AI Planning Unit 542. When an increase is anticipated, voice calls are identified (STEP 616), and action can be taken proactively (STEP 618) to provide an appropriate service to a larger number of UEs, and to prevent service interruptions. This action can de-prioritize certain services, and/or change parameters. For example the voice bit rate can be decreased, the ranges in the allowed QoS parameters can be decreased, bitrates can be decreased (e.g., voice, web browsing, video), the number of uses supported on a given service can be decreased (e.g., set to a minimum), and the scheduler efficiency can be changed as described above to prioritize certain services over others.

(17) Recognizing VoIP Call and Granting QoS

Recognizing VoIP packets (i.e., VoIP traffic) and allowing for an appropriate QoS to be granted can significantly improve the voice quality of a VoIP call. First however a VoIP call must be identified as a VoIP. Sometimes it is clear that a session's traffic is VoIP, for example the network may have been notified in some manner. However, in other instances, there is no indication, and the individual VoIP packets appear no different from any others.

Figure 7:
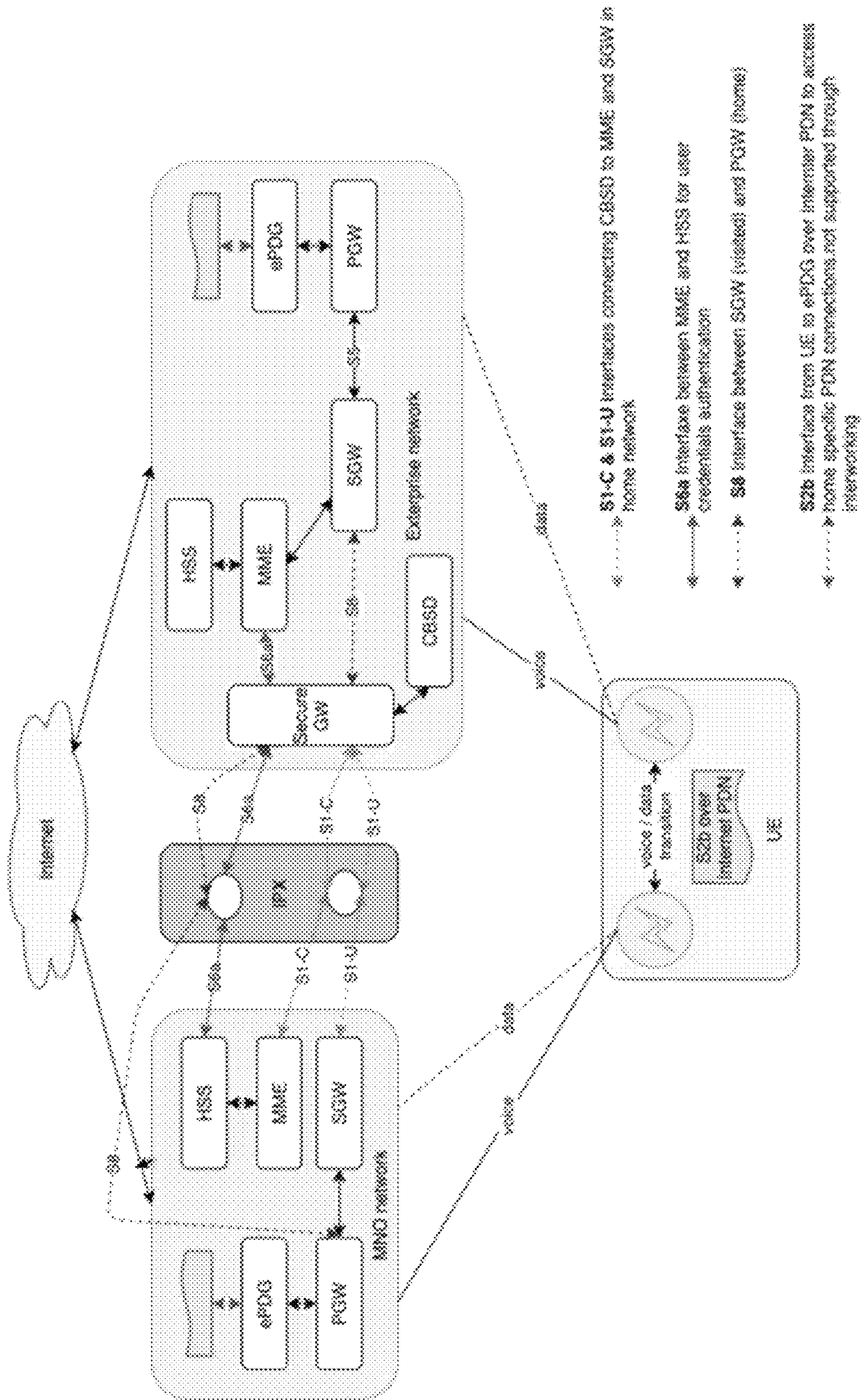
FIG. 7 is a block diagram of a communication system that shows an example of a scenario in which the VoIP call is routed from a UE, through the wireless (CBRS) network, through the internet, and then to the Mobile Network Operator (MNO).

For example, there are scenarios where the CBRS Enterprise network does not have direct connectivity with the MNO network, and the UE has acquired Enterprise credentials to allow for data offload on the CBRS network. FIG. 7 is a block diagram of a communication system that shows an example of a scenario in which the VoIP call is routed from a UE, through the wireless (CBRS) network, through the internet, and then to the Mobile Network Operator (MNO). Under such scenarios, the UE may have established an ePDG (evolved Packet Data Gateway) tunnel connectivity to reach, for example the IP Multimedia Subsystem (IMS) services from the MNO network. IMS is a general-purpose, open industry standard for voice and multimedia communications over packet-based IP networks. It is a core network technology, that can serve as a low-level foundation for technologies like VoIP, Push-To-Talk (PTT), Push-To-View, Video Calling, and Video Sharing. In this scenario, the VoIP packets are tunnel packets transmitted over the Internet PDN via the CBRS network.

The voice quality of a VoIP call can be significantly improved by recognizing VoIP Packets and allowing for an appropriate QoS to be granted. However, it can be difficult to distinguish the packets of a VoIP call from other, non-VoIP packets, especially if the packets are being transmitted through a tunnel such as a VPN tunnel. To identify VoIP call packets from the packets of all the other sessions at a BS/AP, incoming and/or outgoing packets are analyzed for signatures, using deep packet inspection, which inspects the headers and other portions of the packet to look for voice packet signatures. In some embodiments, the recognizing VoIP packets is done using Deep learning. Signatures of VoIP traffic include uniform packet sizes that are relatively small (e.g., ~100 bytes-150 bytes) and the packets are periodic (e.g., the packets are generated every 20 ms). In addition, the VoIP packets may arrive bursty and with more jitter than other packets, especially in a system that operates in 40 ms DRX (Discontinuous Reception, which is used to conserve battery energy), in which the VoIP packets generated every 20 ms often arrive in groups of two or more.

In summary, the network traffic of a VoIP call with a given UE exhibits distinct listen, silence, talk periods that can be identified by observing, respectively: 1) the downlink (DL), 2) no-traffic (except control packets), and 3) uplink (UL). The ongoing communication sessions are analyzed to look for these signatures, and if found, the session is identified as a VoIP call session. Even during the silence periods, the control packets are exchanged in-band on the same channel as the VoIP traffic, and these control packets also exhibit the same signature that can be used to identify a VoIP session.

After a VoIP session has been identified, the appropriate QoS is assigned to it. If action is being taken (STEP 618) to de-prioritize certain services in anticipation of an impending overload, then the VoIP session is marked as a voice call, which will give it a higher level of service than a generic data session. In addition, the VoIP-identified session packets may be marked with DSCP (Differentiated Services Code Points) codepoints for transmitting through the internet (e.g., the packets can be marked as expedited forwarding packets) so that internet recognizes that the packets are to be sent expeditiously, with minimal delay, jitter, and loss.

In some embodiments, recognizing the VoIP session may include recognizing voice over long-term evolution (VoLTE) packets, the IP Planning system recognizes the congestion levels for appropriate bit rate grants, and the network enables RTP (Real-time Transport Protocol) packet bundling.

The following summarizes some data collection and training/learning methods for service types. 1) To learn to recognize peak utilization of service types, data is collected to determine services that have peak utilization, per BS/AP, time-of-day, and day-of-week. The training/learning method is to determine the popular service(s) and ensure resource availability by regulating other traffic/QoS allowed for this service. 2) For voice traffic recognition, collect data and look for a specific pattern of talk/listen/silence, periodically-generated packets, and uniform packet sizes. The packet sizes are dependent on the type of connectivity. In one embodiment, recognizing a voice over ePDG (connecting to 4G Evolved Packet Core (EPC)) or N3IWF (Non-3GPP Interworking Function) (connecting to 5G core (5GC)) will need to be done given that QoS interface to the PCRF (Policy and Charging Rules Function) will not exist for this. The training/learning method has the purpose of granting the QoS bit rates based on the current congestion levels in the network. The bitrates need to account for the packet sizes carried over the ePDG/N3IWF connection. Features like RTP packet bundling can be enabled to reduce packet-header-size implications.

Although the disclosed method and apparatus is described above in terms of various examples of embodiments and implementations, it should be understood that the particular features, aspects and functionality described in one or more of the individual embodiments are not limited in their applicability to the particular embodiment with which they are described. Thus, the breadth and scope of the claimed invention should not be limited by any of the examples provided in describing the above disclosed embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described with the aid of block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method of monitoring, managing, and controlling an enterprise wireless communication network, the enterprise network including a Radio Access Network (RAN) that includes a plurality of Base Stations/Access Points (BS/APs) located at a campus location communicating with a plurality of User Equipment devices (UEs), the method comprising:

monitoring RAN operations over a period of time to provide usage and service data for the BS/APs;

data mining the usage and service data to detect usage and service patterns; and monitoring network operations, and re-allocating network resources proactively in response to the usage and service patterns to avoid congestion and provide appropriate service to the plurality of UEs; and proactively offloading one or more data flows from the enterprise network to another network to avoid congestion and provide appropriate service to the plurality of UEs.

2. A method of monitoring, managing, and controlling an enterprise wireless communication network, the enterprise network including a Radio Access Network (RAN) that includes a plurality of Base Stations/Access Points (BS/APs) located at a campus location communicating with a plurality of User Equipment devices (UEs), the method comprising:

monitoring RAN operations over a period of time to provide usage and service data for the BS/APs;

data mining the usage and service data to detect usage and service patterns; and monitoring network operations, and re-allocating network resources proactively in response to the usage and service patterns to avoid congestion and provide appropriate service to the plurality of UEs, wherein:

the data mining step further comprises identifying congestion hotspots based on the day-of-the-week and time-of-day, and including using machine learning to predict heatmaps for the individual BS/APs; and using artificial intelligence planning to proactively re-allocate resources and balance the number of users with the level of service supported with the network resources available.

3. A method of monitoring, managing, and controlling an enterprise wireless communication network, the enterprise network including a Radio Access Network (RAN) that includes a plurality of Base Stations/Access Points (BS/APs) located at a campus location communicating with a plurality of User Equipment devices (UEs), the method comprising:

monitoring RAN operations over a period of time to provide usage and service data for the BS/APs;

data mining the usage and service data to detect usage and service patterns; and monitoring network operations, and re-allocating network resources proactively in response to the usage and service patterns to avoid congestion and provide appropriate service to the plurality of UEs;

using machine learning to recognize demand patterns for services;

recognizing VoIP packets using deep learning; and adjusting the QoS parameters and bitrate resource allocation based on the recognized and predicted demand for a given service.

4. A method of proactively controlling the wireless communication load in an enterprise network situated in a campus location that includes a plurality of BS/APs wirelessly communicating with a plurality of UEs on the campus, comprising the steps of:

monitoring the communications between the BS/APs and the UEs to collect channel occupancy data on each of the BS/APs;

data mining the channel occupancy data to identify congestion hotspots as a function of time;

responsive to the congestion hotspots and the channel occupancy data, data mining to create heatmaps of BS/AP usage over time and make congestion predictions as a function of time;

responsive to predicted congestion, use artificial intelligence (AI) planning to determine a plan for the network to reduce the predicted congestion by at least one of re-allocating resources, refusing admission of new UEs, and offloading UEs to other networks; and proactively controlling the BS/APs responsive to said AI planning, prior to the predicted congestion, to reduce congestion by at least one of re-allocating resources, refusing admission of new UEs, and offloading UEs to other networks.

5. The method of claim 4 wherein the step of re-allocating resources includes at least one of restricting Quality of Service (QoS) grants, adjusting the transmit power of BS/APs, and active load balancing.

6. The method of claim 4 wherein the data mining step includes utilizing machine learning techniques to provide heatmaps as a time-series of events.

7. The method of claim 6 further providing location data for said BS/APs, and the heatmaps include location in the time-series of events.

8. The method of claim 4 wherein the wireless network operates on the Citizen's Broadband Radio Service (CBRS band), and the BS/APs comprise CBRS Devices (CBSDs) that are located at the campus location.

9. A method of proactively controlling service load in a wireless communication enterprise network situated in a campus location that includes a plurality of BS/APs wirelessly communicating with a plurality of UEs on the campus, the UEs making service requests, comprising the steps of:

monitoring service type requests and collecting service type demand data;

data mining the service type demand data to learn service demand patterns;

responsive to the service demand patterns, using artificial intelligence planning to develop policies to meet the service demand patterns and build preferences to support the policies and service demand patterns; and responsive to the service demand patterns and policies, monitor service type requests, predict service demand increases, and take action proactively to de-prioritize certain services.

10. The method of claim 9 wherein the data mining step includes utilizing machine learning techniques to provide service demand patterns as a time-series of events.

11. The method of claim 9 wherein the proactive action to de-prioritize certain services includes changing the scheduler efficiency to define the relative priority of the services.

12. The method of claim 9 wherein the proactive action to de-prioritize certain services includes at least one of: decreasing bitrates for at least one of voice, web browsing, and video, decreasing the ranges in the allowed QoS parameters, decreasing the number of uses supported on a given service, and changing the scheduler efficiency to define the relative priority of the services.

13. The method of claim 9 wherein the wireless communication enterprise network includes a packet based IP network that communicates using a plurality of packets and further comprising the steps of:

monitoring the packets and identifying a session of VoIP call packets, and dynamically providing the VoIP session with a bitrate suitable for a voice call.

* * * * *